United States Patent [19]

Walters

[11] Patent Number: 5,657,720

[45] Date of Patent: Aug. 19, 1997

[54] EGG HATCHING DEVICE

[75] Inventor: Matthew J. Walters, Kirkwood, Mo.

[73] Assignee: Hatchrite Corporation, Kirkwood, Mo.

[21] Appl. No.: 502,804

[22] Filed: Jul. 14, 1995

[51] Int. Cl.⁶ .......................... A01K 41/04; A01K 41/06
[52] U.S. Cl. .......................................... 119/317; 119/327
[58] Field of Search .................................. 119/35, 37, 43, 119/44

[56] References Cited

U.S. PATENT DOCUMENTS

| | | | |
|---|---|---|---|
| 1,264,664 | 4/1918 | Light | 119/44 |
| 2,163,363 | 6/1939 | Markey | 119/35 |
| 2,176,484 | 10/1939 | Blakeslee | 119/37 |
| 3,783,833 | 1/1974 | Bailey | 119/44 |
| 4,606,299 | 8/1986 | Grumbach | 119/35 |
| 5,410,985 | 5/1995 | Schritz | 119/37 |

FOREIGN PATENT DOCUMENTS

1055450  11/1983  U.S.S.R. .................. 119/35

*Primary Examiner*—Robert P. Swiatek
*Assistant Examiner*—Elizabeth Shaw
*Attorney, Agent, or Firm*—Polster, Lieder, Woodruff & Lucchesi, L.C.

[57] ABSTRACT

A device for incubation and hatching of bird eggs having an insulated cabinet for housing the eggs and an associated environmental control box. The cabinet is completely sealed and has a sealed door to maintain internal air pressure. There is a controlled air inflow vent at the top of the cabinet and an exhaust vent at the bottom of the cabinet. There is an environmental control unit in fluid communication with the air inflow vent. The control box has an air inflow port, a heater and humidifier. The air flow, temperature and humidity are preset and electronically monitored and controlled. The device also contains computer means for monitoring the incubation of the eggs. One or more fans moves the air into the cabinet. The air flows from the top to the bottom of the cabinet to maintain a uniform desired environment for the eggs. The cabinet contains an interchangeable egg rotating device. In one preferred embodiment, the egg turning device includes a plurality of spaced apart rotatable rods to hold the eggs between the rods. The eggs rotate as the rods rotate. In another embodiment, the egg rotating device is a rotary rack having a plurality of egg holders. The rack can be round or rectangular in cross-section. In another embodiment, the egg rotating device is a drawer containing a plurality of horizontally aligned rotatable egg holders.

24 Claims, 11 Drawing Sheets

EGG HATCHING DEVICE

BACKGROUND OF THE INVENTION

This invention relates generally to the propagation of bird eggs and, more specifically, to a device used for the incubation and/or hatching of emu, rhea and ostrich eggs. While the invention is discussed in particular detail with respect to such large bird eggs, those skilled in the art will recognize the wider applicability of the invention described hereinafter.

Within the last few years there has been a growing interest in the raising of emus, rheas, and particularly ostriches. The interest in ostriches is due to the fact that there is a growing market for ostrich products such as leather, feathers and the meat, which is low in cholesterol and has an appealing flavor. Ostrich hens generally lay eggs every other day between March and September. An adult hen of breeding age can sell for as much as $15,000.00. It is not unusual to see ostrich chicks sell for $1000.00 each. Accordingly, there is a significant incentive for maximizing the hatching of ostrich eggs.

The artificial incubation of eggs of various birds has been recognized as a means for producing larger numbers of birds that can be produced by natural incubation. It also has been recognized that the success rate for artificial incubation differs among the types of birds. The eggs of some birds are more sensitive to environmental conditions during incubation. Therefore, it is advantageous to incubate the bird eggs in uniform optimal environmental conditions including temperature, oxygen flow, and humidity.

Furthermore, it has been recognized that correct turning and positioning of the eggs improve the hatch. Turning is important to keep the yolk or the developing chick from sticking to shell membranes. If the eggs are not properly turned, the chicks can suffer late death in the shell or the surviving chicks can suffer weakness and retarded growth. Correct turning of the egg allows the placenta-like membrane surrounding the embryo to have equal exposure to gravity. I have found this can be accomplished effectively by placing the eggs on their side and rolling the egg 180° at least twice a day. There are a number of incubators available commercially. While these prior art devices work for their intended purpose, they do not exhibit the kinds of hatch rates available with the invention described hereinafter. In particular, I have found that hatch rates for large eggs increased substantially by maintaining the egg environment at a positive pressure. In my invention, this is accomplished by providing a substantially sealed unit and controlling air flow to the incubator in accordance with predetermined flow rates. By exhausting air at the bottom of the incubator, I am able to control humidity levels throughout the incubator precisely. In addition, I am able to roll the eggs with a relatively simple drive system. The incubator itself is controlled by a computer, giving the unit quick response to sensed conditions during the incubation period, including the ability to provide alarms should a catastrophic failure occur, in sufficient time to prevent loss of the entire hatch.

SUMMARY OF THE INVENTION

It is among the principal objects of the present invention to provide a novel device for the propagation of large bird eggs such as ostrich eggs.

It is another object of the invention to provide such a device that controls the environment in which the egg incubates to improve the hatching results of such eggs.

Another object of the invention is to provide such a device wherein the temperature, humidity and oxygen surrounding the eggs are controlled so as to create an optimal environment for the hatching of the eggs.

Yet another object of the invention is to provide such a device capable of rolling or turning the eggs to maximize successful hatching.

Still another object of the invention is to provide such a device that has a plurality of interchangeable devices for rolling or turning the eggs during incubation to enhance the hatching rate.

A still further object of the invention is to provide such a device that is well insulated and completely sealed when closed so as to protect the controlled internal environment.

Yet another object of the invention is to provide such a device that is economical to manufacture, easy to install and use, capable of expansion or stacking in multiple units, and well suited for its intended purpose.

In accordance with the invention, a device for the incubation and hatching of bird eggs is provided having an insulated cabinet for housing the eggs and a second smaller environmental control box mounted on the back of the cabinet. The cabinet has a sealed door and the cabinet is completely sealed when the door is closed to maintain the internal environment and a positive air pressure during use. The cabinet employs interchangeable egg rolling or rotating means. In one preferred embodiment, the cabinet contains an egg rolling device including a plurality of spaced apart rotatable rods, the spacing of which is such that the width of the eggs can be supported between adjacent pairs of rods so that the eggs are rolled when the rods are rotated. In another embodiment, the cabinet contains a rotary rack egg mining device. The rotary rack egg turner contains a plurality of egg holders formed from four horizontal rods. The eggs are held between the rods. The egg turner rotates thereby rotating the holders and eggs. The rotary rack egg turner can be round or rectangular in cross-section. In another embodiment, the egg rotator is a drawer having a plurality of rotatable egg holders in horizontal alignment within the drawer.

The environmental control box is in fluid communication with the cabinet. Outside air, moisture and heat are combined for flow into the cabinet. The temperature, humidity and oxygen flow in the cabinet are monitored and computer controlled. Air from the control box is forced into the top of the cabinet by one or more controlled fans to maintain the desired environment for the eggs. The cabinet is vented at the bottom to remove carbon dioxide and excess humidity. More air enters the cabinet than is exhausted thereby creating a positive pressure within the cabinet. The temperature, air flow, barometric pressure and humidity within the cabinet are substantially respectively uniform so that all of the eggs are exposed to the optimal environment. Preferably, the cabinet and control box are designed as an integral unit. The units can be stacked to form convenient multiple units.

DESCRIPTION OF THE PREFERRED EMBODIMENT

Figure 1:
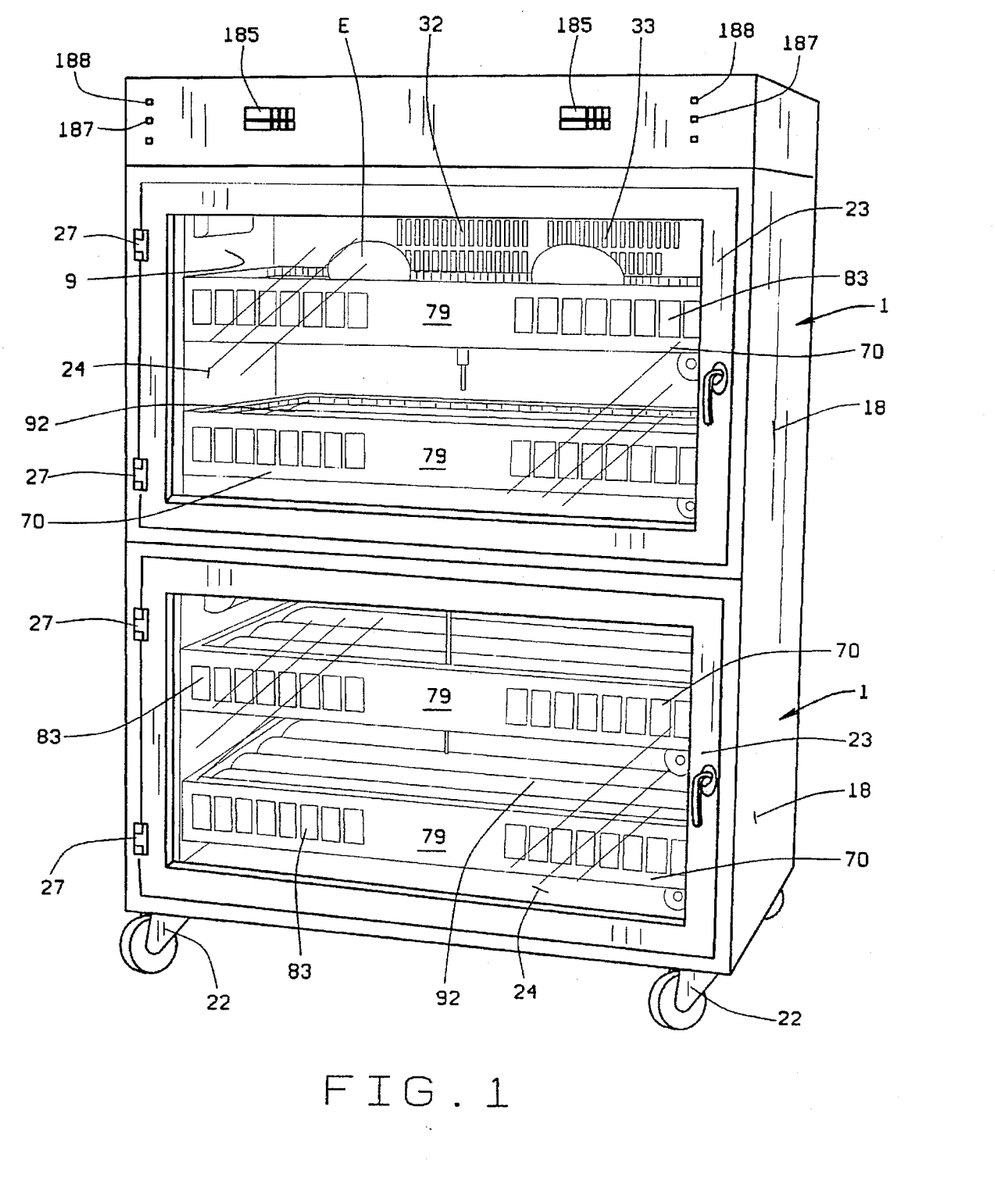
FIG. 1 is a front plan of a pair of the incubator devices of the present invention arranged in a stacked configuration.
Figure 2:
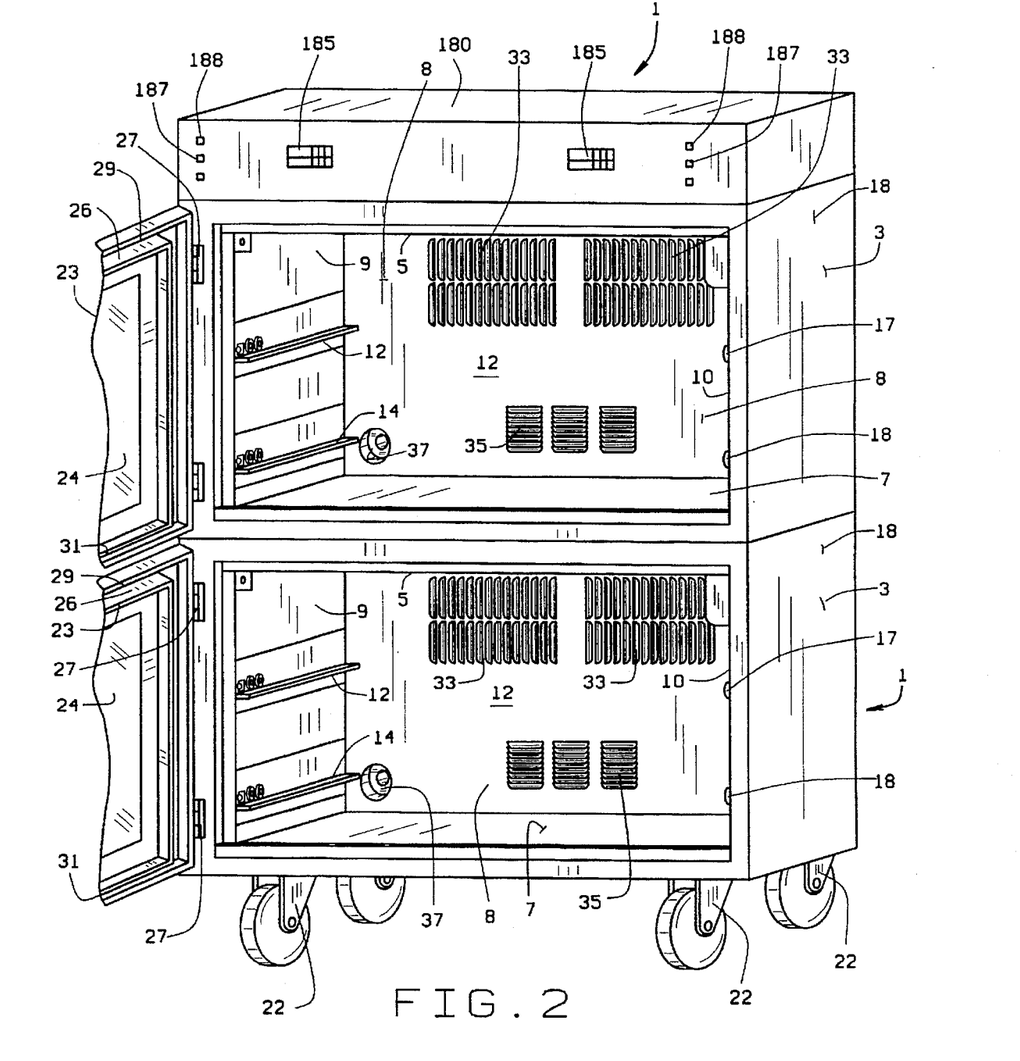
FIG. 2 is a front plain of the incubator devices of FIG. 1 with the sealed doors open and the egg rotating elements removed.

An egg incubating device of the present invention is indicated generally be reference numeral 1 in the drawings. FIGS. 1 and 2 illustrate a pair of devices 1 in a stacked arrangement. It will be appreciated that device 1 can be used alone or in the preferred stacked arrangement. As best seen in FIG. 2, each device 1 has a generally box-like cabinet 3. Cabinet 3 has a interior top wall 5, bottom wall 7, rear wall 8 and opposed side walls 9 and 10. The interior walls preferably are stainless steal and define an internal chamber 12. In the preferred embodiment, chamber 13 has a volume of approximately 16.5 cubic feet. There is a pair of conventional drawer rollers 14 and 15 mounted on interior side wall 9 and a complementary pair of drawer rollers 16 and 17 mounted on interior side wall 10. The drawer rollers are designed to accommodate a pull-out, shelf-type egg roller element to be described in detail below.

Cabinet 3 has outer side walls 18, top wall 19 (FIG. 6) and bottom outer walls (not shown) and an rear outer wall 19.

Between the inner and outer side walls there is a suitable insulative layer 21. A two inch polymeric isocryanate injected insulation layer works well, for example. The lower cabinet 3 may be mounted on four casters 22.

Device 1 has a wide door 23. Each door 23 has a double pane window 24 with a gas between the panes and a sealed frame 26 around the panes. The door is connected to the cabinet by conventional hinges 27 and seals tightly with robber seals 29 and 31 which surround both the interior perimeter of the window and the door itself when closed.

As best seen in FIG. 2, interior rear wall 8 has a pair of upper louvered vents 33 and a substantially smaller lower louvered vent 35. The upper vents 33 functions to allow air to flow into the chamber from the environmental control box and lower vent 35 is a recirculating air vent. Vent 35 extends through both the interior and outer rear walls and can be seen externally in FIG. 4. An exhaust port 37 is located at the extreme lower corner of the back wall. The interactive functions of the respective vents and port will be described in greater detail below.

Figure 3:
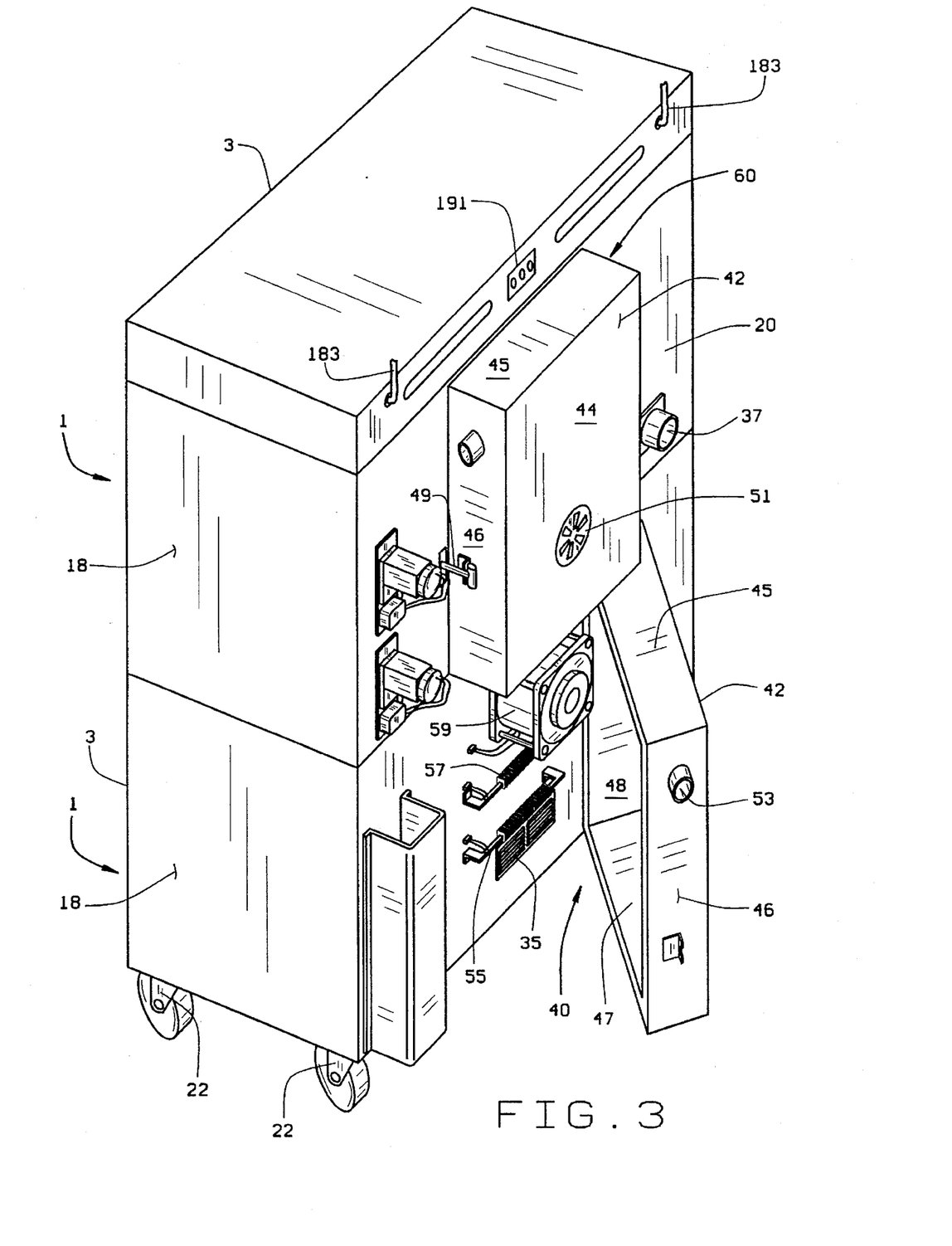
FIG. 3 is a rear perspective view of the incubator devices of FIG. 1, the lower device having the environmental control box opened.
Figure 4:
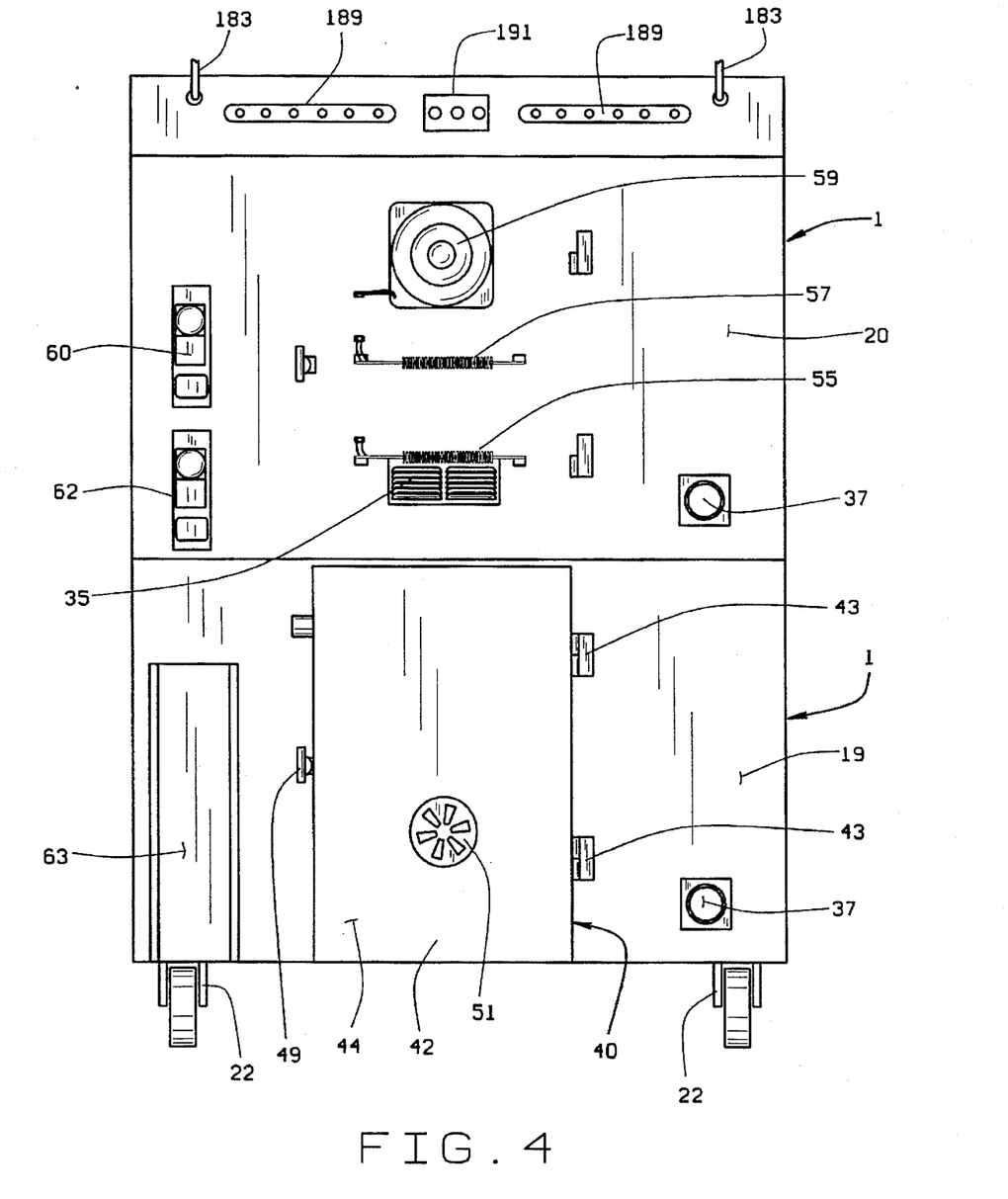
FIG. 4 is a rear elevational view of the incubator devices of FIG. 1, the top device having the environmental control box and motor cover removed.

The environmental control box 40 and the components therein will now be described in detail. As best seen in FIGS. 3 and 4, control box 40 has a box-like shroud 42 which is attached to outer rear wall 20 with conventional hinges 43. Shroud 42 has an outer wall 44 and four side walls 45, 46, 47 and 48. Shroud 42 cooperates with outer rear wall 20 to form a closed box. Shroud 42 can be swung outward to provide access to the elements of the control box. A securing latch 49 holds the shroud tightly against the rear wall when closed. The embodiment illustrated has a dampered air inlet vent 51 approximately two-thirds of the way down the outer wall 44 and a humidifier inlet 53 near the top of side wall 46.

The components within control box 40 are best seen in FIGS. 3 and 4. Control box 40 functions as an air mixing chamber. There is a first or lower electric heating element 55 just above louvered vent 35 and a second or upper heating element 57 at an approximate midpoint of wall 20. A fan 59 is positioned above heating element 57 at the top of box 40. Fan 59 is positioned at louvered vent 33 (FIG. 2) so that air moved by the fan flows into chamber 12 through the vent.

Figure 5:
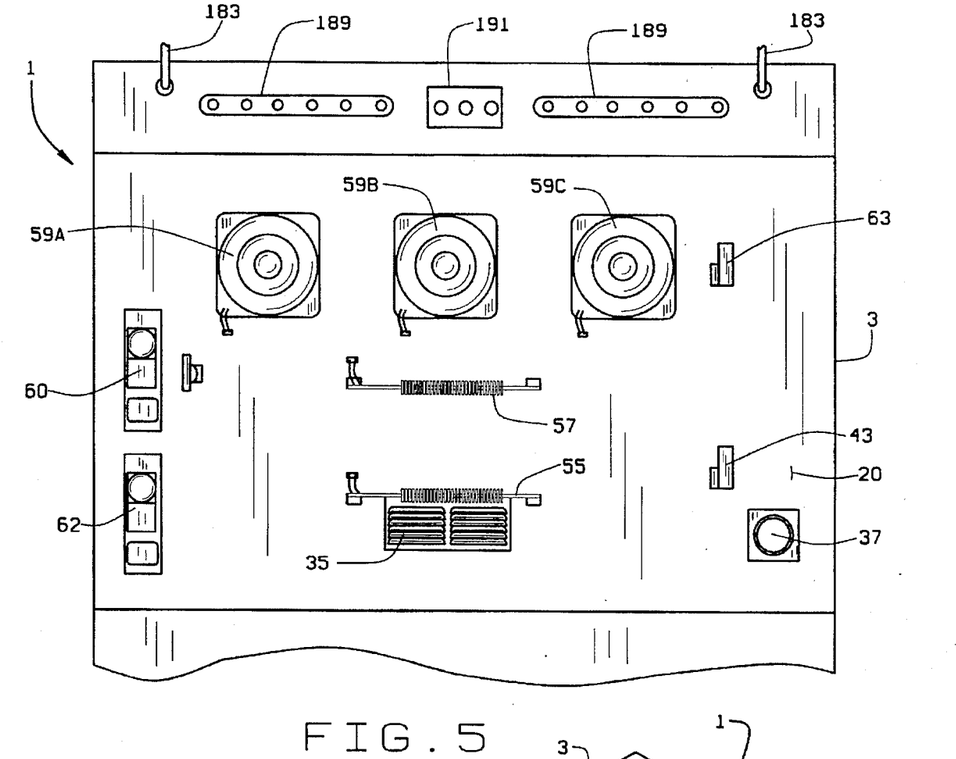
FIG. 5 is a rear elevational view of another larger embodiment of the incubator device of the present invention, the environmental control box removed, showing the three fan configuration.

FIG. 5 illustrates another embodiment of the incubator device of the present invention having a larger volume internal chamber. As will be appreciated, the device employs three fans, 59A, 59B and 59C in horizontal alignment across the back wall of the cabinet. The three fans are positioned to move air through the louvered vent 32 in the top of interior rear wall 8 and into the chamber 12. The three fan arrangement allows for an increased fresh air flow from the environmental control box into the chamber to maintain a positive pressure in a larger chamber 12.

There are a pair of electric motors 60 and 62 in vertical alignment on the back of the unit. Motor 60 is operatively connected to an upper egg rolling device and motor 62 is operatively connected to a lower egg rolling device, both located within the chamber. The motors are controlled by the electronic control system to drive the respective egg rolling devices, as will be explained in greater detail below. Both electric motors are protected by a removable shroud 63 (FIG. 4).

The various egg rolling or rotating devices of the present invention will now be described in detail. The preferred embodiment of an egg rolling device employed in the incubator of FIG. 1 is best illustrated and shown in greater detail in FIGS. 7 and 8. As there shown, the egg rolling device is indicated generally by the reference numeral 70. It should be noted that device 70 is shown upside down in FIG. 8 to better disclose the adjustability of the individual rollers.

Figure 7:
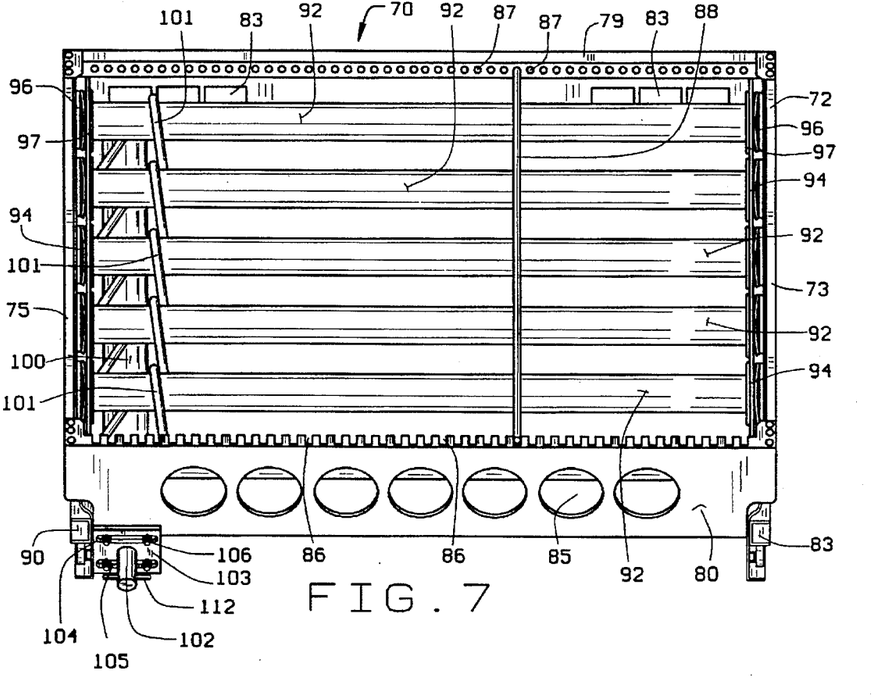
FIG. 7 is a perspective view of one illustrative embodiment of an egg rolling device of the incubator device of the present invention.
Figure 8:
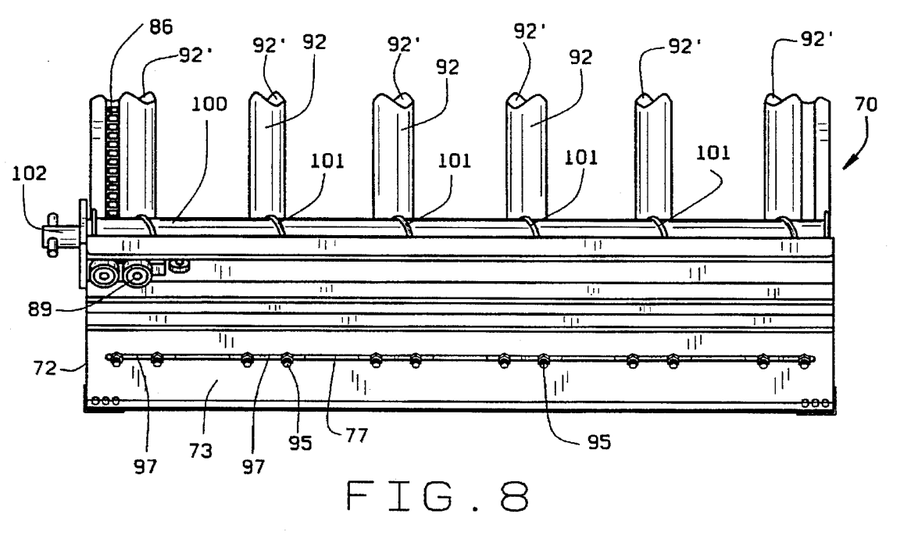
FIG. 8 is a partial end, view from the bottom, of the egg rolling device of FIG. 7.

As will be appreciated, device 70 is designed as a removable drawer. Device 70 has a generally rectangular frame 72 dimensioned to fit within chamber 12. Frame 72 has a pair of side members 73 and 75. Each side member has an elongated slot 77 centrally therein for the attachment of the roller bars, as will be described hereinafter. The frame also has a front wall 79 and a rear wall 80. Front wall 79 has a series of large openings 83 formed therein. Rear wall 80 also has a series of large openings 85 formed along its length. The openings 83 and 85 allow air to pass through the drawers and promote good air circulation. Furthermore, there is a series of grooves 86 formed on the top of rear wall 80 and a corresponding set of holes 87 formed in upper edge of front wall 79 to accommodate a ¼ inch rod 88. One or more rods 88 are used to separate eggs or allow eggs to stand up, if desired. That is to say, the device 70 generally is used without the rods 88. However, some breeders prefer to stand the eggs upright and the construction described enables the drawer 70 to provide that function.

There is a conventional drawer roller 89 on a lower edge of side member 73 and a conventional drawer roller 90 on a lower edge of side member 75. Drawer rollers 89 and 90 are designed to engage the drawer rollers mounted on the interior chamber walls to allow device 70 to pull out and slide in like a conventional drawer for loading and unloading eggs.

There are a number of roller bars 92' extending between the side members. The roller bars preferably are covered with a cushioning material which fits securely around each rod to form padded rollers 92. The rollers 92 are spaced apart from each other such that eggs can be supported with their longitudinal axis parallel to the longitudinal axis of the roller. Each roller 92 is rotatably attached to the side members by end cap assembly 94, or other suitable means. Each cap assembly 94 is attached to the groove 77 with by nut and bolt assemblies 95. The end cap assembly has a fixed plate 96 with a bearing 97 that rotates within the fixed plates. The rod is connected to the bearing and the bearing is free to turn in the fixed plate. The fixed plate 96 is releasably secured to the side wall through the groove 77. This arrangement allows the nuts securing the end cap 94 to the side wall to be loosened and so that the end cap can be slid along the length of groove 77 so properly position each roller, relative to the adjacent rollers.

There is a drive roller 100 that extends transversely to the rollers 92. Each roller 92 is connected to the drive roller by a drive belt 101 so that rotation of the drive roller 100 turns each roller 92. The drive belt arrangement is extremely quiet during operation. Drive roller 100 is connected to front wall 79 with an end cap arrangement or other suitable means. A drive rod 102 extends from the drive roller and is adjustably connected to the rear wall 80 by an adjustable plastic bushing 103. Bushing 103 is a square plastic bushing having an upper slot 104 and a lower slot 105 formed therein. Bushing 103 is attached to rear wall 80 by screws 106. An end cap assembly 94 connected to the drive roller is attached to the bushing by screws 106. Slots 104 and 105 allow lateral adjustment of the drive roller so that the drive rod can properly engage the motor drive connector 110, shown in greater detail in FIG. 9.

Figure 9:
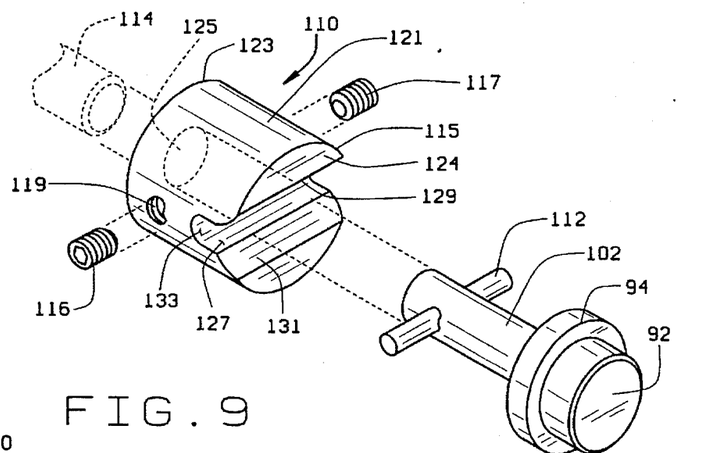
FIG. 9 is a partial view of the motor coupling of the egg rolling device of FIG. 7.

As can be seen in FIG. 8, drive rod 102 protrudes through bushing 103. A small cross rod 112 extends through the tip of drive rod 102 to form a T. As shown in FIG. 9, a motor drive shaft 114 extends into the cabinet from one of the motors 60 or 62. A drive rod T plug 115 is attached to the drive shaft 114 by a pair of set screws 116 and 117 through threaded holes 119. The T plug has a generally cylindrical body 121 with a first end 123 and a second end 124. The first end has an opening 125 or other appropriate means formed therein to engage the motor drive shaft 114. There is a generally deep V-shaped groove 127 formed in the second end 124. The groove 127 has a pair of opposed ramps 129 and 131 which lead to a deep, substantially cylindrical horizontal groove tip 133. Groove tip 133 it dimensioned to seat cross rod 112. Rotation of the motor shaft 114 by the motor will cause the drive rod, and therefore the drive roller 100, to turn. The generally deep V shaped groove 127 provides easy introduction of the drive rod T into the T plug. It will be appreciated that the laterally adjustable arrangement of the drive rod through the bushing and the novel arrangement of the drive rod T and T plug allows the device 70 easily to be introduced into the drawer rollers and engage the motor drive protruding through the back wall of the cabinet.

Figures 10, 11:
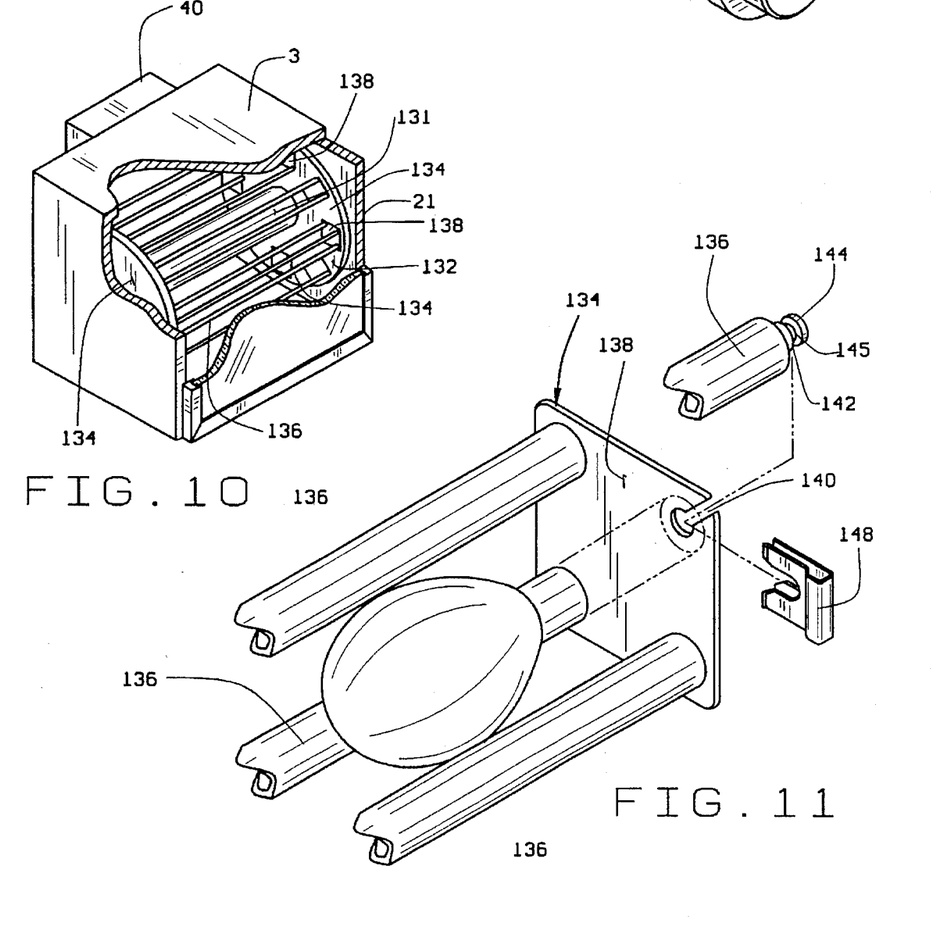
FIG. 10 is a perspective view, partially cut away, of an alternative embodiment of an egg turning element of the incubator device of the present invention.
FIG. 11 is an enlarged end section of an egg holder of the egg turning element of FIG. 10.

FIGS. 10 and 11 illustrate an alternative embodiment of a device for turning or rotating eggs, indicated generally by reference numeral 130. Device 130 is a rotary rack egg turner having a generally drum-like configuration, or circular cross-section, and is dimension to fit with in the cabinet as shown in FIG. 10. Device 130 has a horizontal axle and a first circular end wall 132 and a second circular end wall 134. Gear or belt means (not shown) disposed to engage the motor drive are employed to rotate the device about its horizontal axle.

Device 130 has a number of egg holders 134. Each egg holder 134 is comprised of four horizontal rods 136. The rods are covered with a protective material such as foam rubber or the like. The rods 136 are arranged in a generally square pattern with one rod at each corner, and appropriately spaced apart so that an ostrich or emu egg E will be secured within the rods. The rods 136 are connected to a square end plate 138, as best seen in FIG. 11. The end plate 138 has an open corner slot 140. One of the rods 136 terminates in a first concentric rod section 142 and then a second concentric rod section 143, having a disc 144 on the end. The second concentric rod section 143 seats in slot 140 and the disc 144 engages the back side of the plate 138. A clip 148 slides over the first concentric rod section 142 to close slot 140 and secure the rod in place. This slot 140 and clip 148 arrangement allows the rod to be removed so that eggs can be placed in or removed from the holder 134. Other fastener arrangement are compatible with the broader aspects of my invention. It will be appreciated that as the device 130 rotates about its horizontal axis, the eggs in the respective holders 134 also with rotate about their horizontal axes. Since the device has a circular cross section, the associated eggs always are moved about their horizontal axes as the device rotates.

Figures 12, 13:
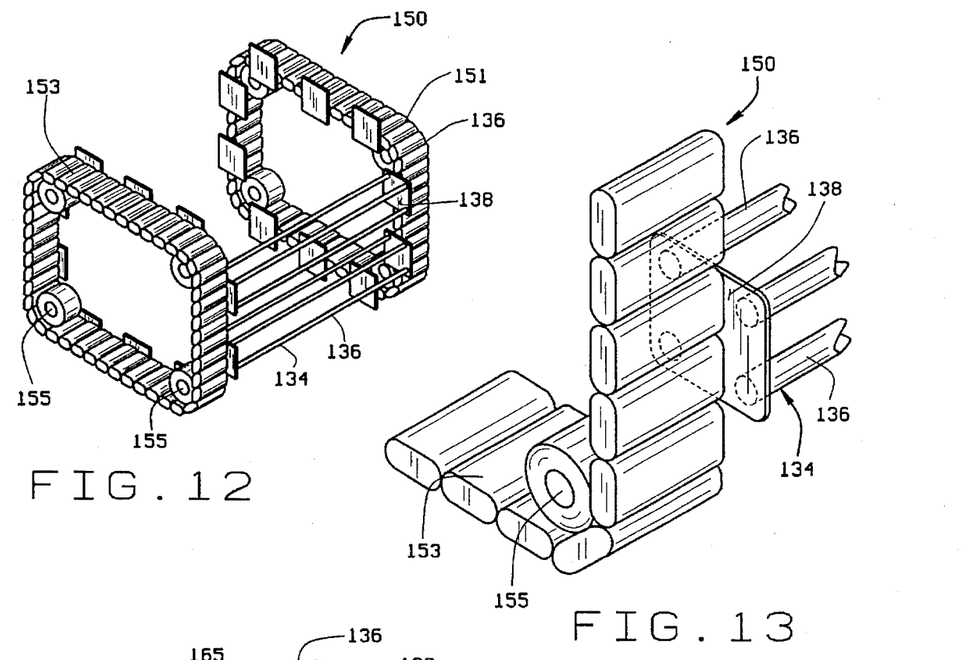
FIG. 12 is a perspective view of another alternative embodiment of an egg turning element of the incubator device of the present invention.
FIG. 13 is a partial section of the drive track and egg holder assembly of the egg rotating element of FIG. 12.

FIGS. 12 and 13 illustrate another alternative embodiment of a rotary rack egg turning device, indicated generally by reference numeral 150. The rotary egg turning device 150 has a generally rectangular cross-section which imparts a somewhat different rotational pattern than does the circular rotary device 130, just described.

Device 150 employs egg holders 134 constructed in accordance with the description above. However, the end plates 138 of the egg holders are attached to a pair of drive belts 151 and 153. Each belt engages at least four drive wheels 155. A four point positioning of the drive wheels 155 gives the device 150 its rectangular design. At least one of the drive wheels 155 is operably connected to the drive shaft of a motor 60 or 62. Rotation of the drive shaft turns the wheel 155 thereby moving the belts 151 and 153 and the associated egg holders 134. Since the device 150 is generally rectangular, the egg holders move about in a generally rectangular path. The eggs eventually are turned about their horizontal axis. However, in this embodiment the eggs remain positionally static for a longer period of time as the egg holder traverses each flat side of the rectangular travel path.

Figures 14, 15:
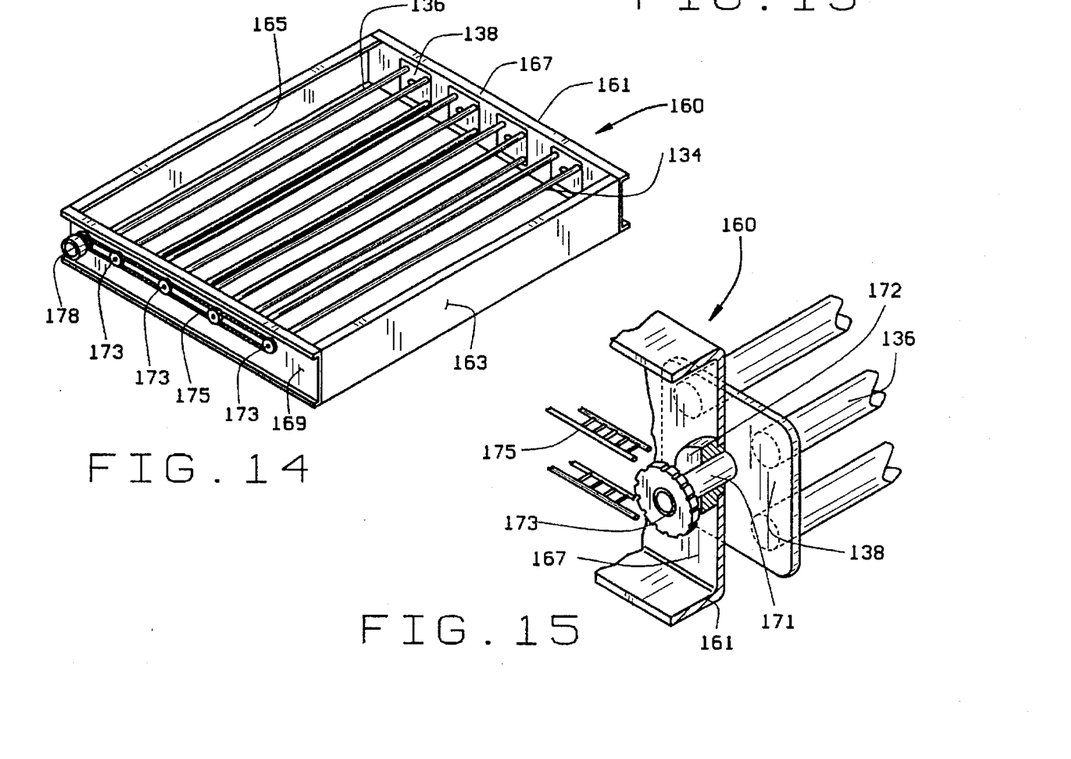
FIG. 14 is a perspective view of another alternative embodiment of an egg rotating element of the incubator device of the present invention.
FIG. 15 is an enlarged partial view of the egg holder drive from the egg rotating element of FIG. 14.
Figure 16:
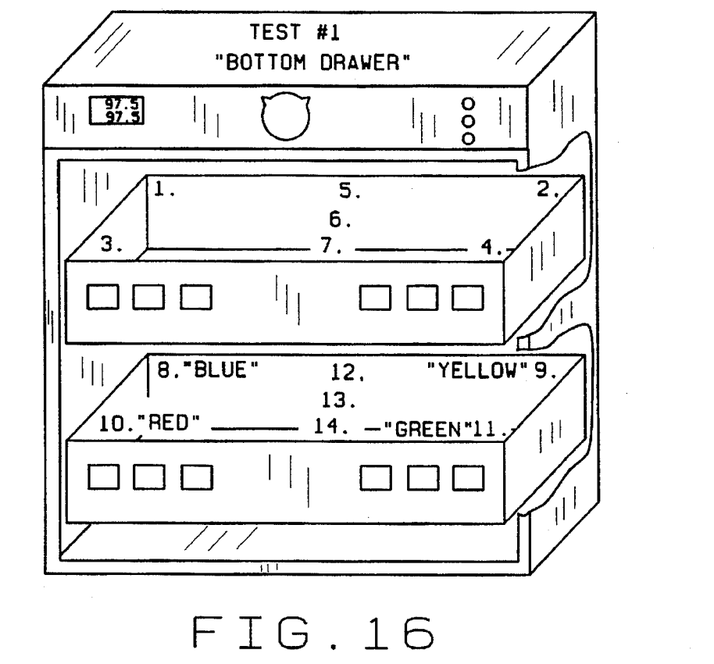
FIG. 16 is a schematic drawing of the incubator device of the present invention illustrating the test results from Test #1.
Figure 17:
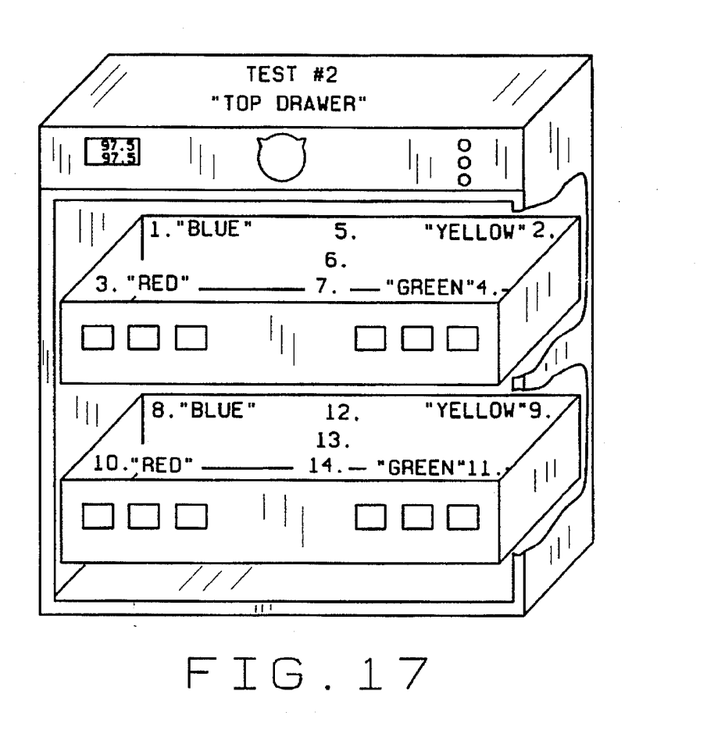
FIG. 17 is a schematic drawing of the incubator device of the present invention illustrating the test results from Test #2.
Figure 18:
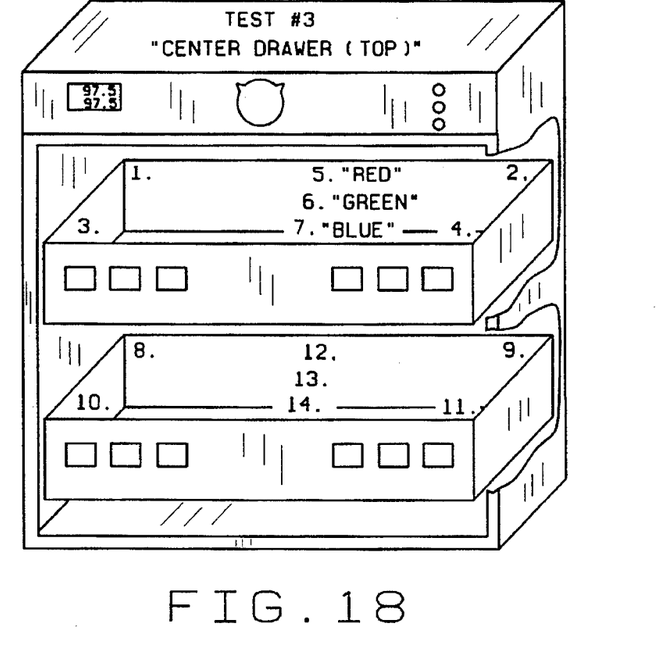
FIG. 18 is a schematic drawing of the incubator device of the present invention illustrating the test results from Test #3.
Figure 19:
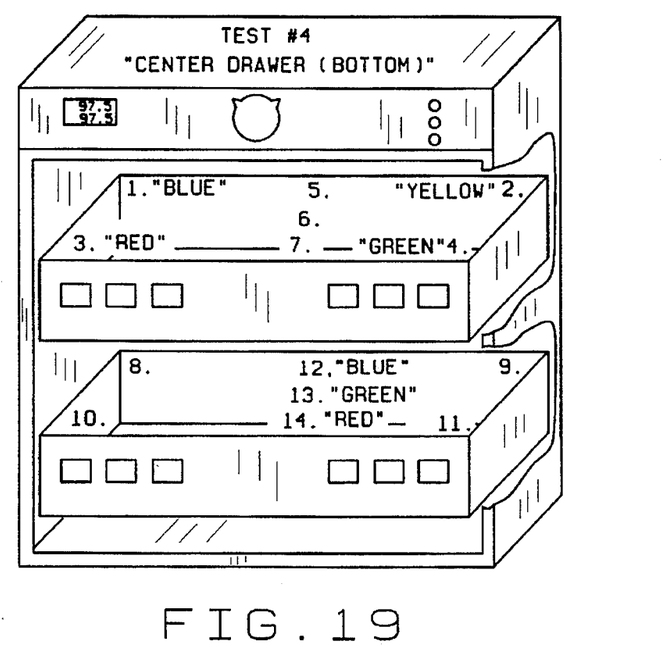
FIG. 19 is a schematic drawing of the incubator device of the present invention illustrating the test results from Test #4.
Figure 20:
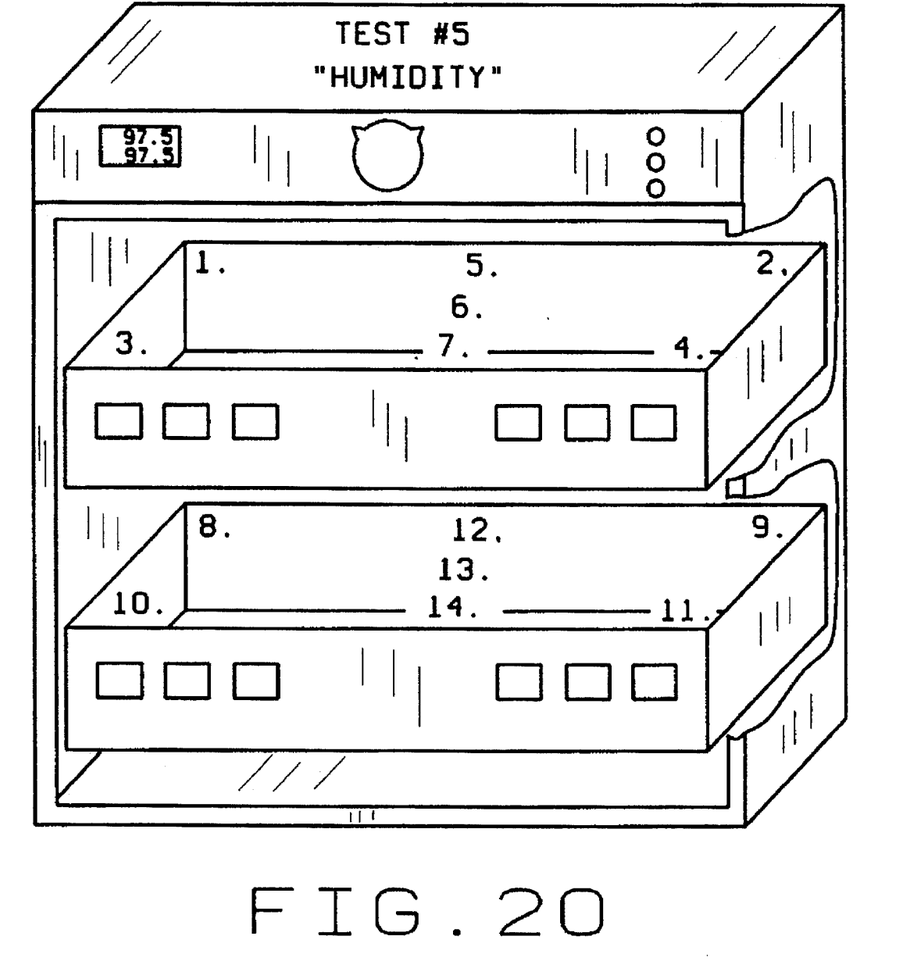
FIG. 20 is a schematic drawing of the incubator device of the present invention illustrating the test results from Test #5.

FIGS. 14 and 15 illustrate yet another embodiment of an egg turning device, indicated generally be reference numeral 160. Device 160 is designed like a drawer having a generally rectangular frame 161. Frame 161 has a front wall 163, a rear wall 165 and opposed side walls 167 and 169. There are a number of egg holders 134, constructed in accordance with the description above, in horizontal alignment within frame 161. However, each end plate 138 has a short drive rod 171 that extends through a bushing 172 in an opening in side wall 167. There is a gear 173 on the end of each drive rod. A continuous drive track 175 engages the teeth on the respective gears 173. The drive track 175 is driven by a drive wheel 178 which is operably connected to the drive shaft of a motor (not shown). It will be appreciated that as the drive track moves, the gears 173 are turned and the associated egg holders 134 are rotated about a horizontal axis, thereby rotating the eggs.

The device 1, as shown in FIGS. 1-4, has an electronic control system 180 housed on top of the unit. System 180 maintains separate and independent preset temperature and humidity in both the upper and lower units. It is believed that optimal temperature for propagation of ostrich eggs is in the range of about 97° to 97.5° F. and a humidity in the range of 20% to 55%. The control system, as best seen in FIGS. 1-4, has an electrical cord 183 for connecting the control system to a power source, not shown. The control system 180 has a plurality of digital set buttons and displays 185 that enable an operator to set and read the internal temperature and humidity for each unit. There are a series of button switches 187 for roll testing and resetting. There also are indicator lights 188 for indicating low water. There are fuse panels 189 on the back as well as ports 191 for connecting room air sensing devices to the control system.

The electronic control system 180 also controls the motors 60 and 62 to allow the associated egg rotating devices to rotate the eggs a complete 180° clockwise and then back 180°. The 180° rolling allows yolk sac nutrients to be supplied to the growing embryo. The system also has alarms for high/low temperature and high/low humidity. It is preferred that the eggs be rotated about 180° during each period of rotation and that the periods of rotation occur about every thirty minutes to about every four hours. Typically for ostrich eggs the egg is rotated about 180° in about one-half minute.

It will be appreciated that device has a computer operated monitoring system. The system monitors the temperature and humidity settings of the control module of each incubator and the room in which it sets and records the data on an hourly basis. The computer system tracks the weight loss of the eggs and calculates and displays projected weight loss. The computer system also keeps track of the eggs laid and the condition of the eggs when placed in the incubator and the outcome of incubated eggs, among other parameters. The computer system also can warn the operator if service goes out and can be linked to a remote site by telephone.

Figure 6:
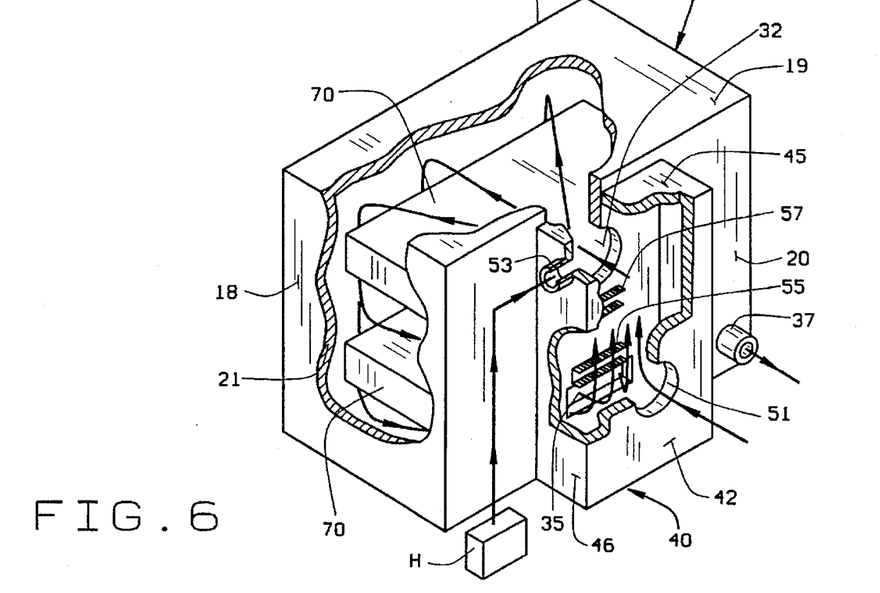
FIG. 6 is a rear perspective, partially schematic, illustrating the controlled air flow through an incubator device of the present invention.

The unique environmental control box 40 functions to enhance the outcome of incubation by allowing fresh air, heat and humidity to be better controlled by premixing before introduction into chamber 12. As best seen in FIG. 6, fresh air enters air vent 51. The air is appropriately heated to a preset temperature under electronic control, by the heating elements 55 and 57. Moisture is added, as needed to reach a preset humidity, by a humidifier H connected to the humidifier vent 53. The controlled air enters the top of chamber 13 through the upper louvered vent drawn by fan 49. Preferably the fan can move 15 to 25 cubic feet of air per square foot of cabinet space. The air flows downward among the eggs and provides a uniform environment throughout the chamber. The various designs of the egg rotating devices described above enhance the air flow and promote uniformity of the internal environment. The air is drawn back into the control box 40 through the lower louvered vent 35. This circular flow pattern enhances the uniform dispersal of the air, heat and moisture. However, since the moisture and carbon dioxide are heavier that the air, those components of the recirculated air are vented off through the exhaust port 37 located near the bottom of the cabinet. The exhaust is vented at a rate of approximately 35 cubic feet of exhaust per minute or 2 cubic feet of exhaust per square foot of cabinet, less than the air flow into the cabinet, as stated above. The exhaust vent is the only exist from the device. Tests have shown that under normal operating conditions, the barometric reading outside the device was 958 millibars or 28.30 inches of Mercury while the reading inside was 961 millibars or 28.39 inches. Therefore, a positive pressure is maintained within the chamber.

Moreover, since the cabinet is so well insulated and sealed, the temperature inside is maintained within 0.35 degree. The device also controls the humidity to plus or minus 1% relative humidity. However, the electric control system can be monitored to make sure that the temperature and humidity are maintained at the desired settings.

The uniformity of the environment within the chamber 12 is demonstrated by a number of tests. The temperature was tested at discrete points in within the chamber. The points tested included the extreme corners of the cabinet as well as representative points therebetween. The tests indicated that beginning with a set-point temperature of 97° F., that there was an evenness of temperature throughout the chamber, varying between only by 0.7° between readings. Furthermore, the test indicated that the temperature within the cabinet was within ±0.35° over ten minutes starting at room temperature.

The above summarized tests are best illustrated by FIGS. 16-20 when viewed along with the following tables:

| TEST #1 (FIG. 16) OXYGEN AT EXHAUST: 21.1 SET POINT AT 97.0° F. | | |
|---|---|---|
| POSITION | COLOR CODE | TEMP.(degrees F) |
| START | | |
| 10 | RED | 94.2 |
| 8 | BLUE | 94.8 |
| 11 | GREEN | 93.5 |
| 9 | YELLOW | 92.7 |
| 1 MINUTE | | |
| 10 | RED | 96.3 |
| 8 | BLUE | 97.1 |
| 11 | GREEN | 96.2 |
| 9 | YELLOW | 95.0 |
| 2 MINUTES | | |
| 10 | RED | 97.0 |
| 8 | BLUE | 97.7 |
| 11 | GREEN | 97.1 |

TEST #1 (FIG. 16)
OXYGEN AT EXHAUST: 21.1
SET POINT AT 97.0° F.

| POSITION | COLOR CODE | TEMP.(degrees F) |
|---|---|---|
| 9 | YELLOW | 95.7 |
| | 3 MINUTES | |
| 10 | RED | 97.2 |
| 8 | BLUE | 97.8 |
| 11 | GREEN | 97.4 |
| 9 | YELLOW | 96.2 |
| | 4 MINUTES | |
| 10 | RED | 96.9 |
| 8 | BLUE | 97.4 |
| 11 | GREEN | 97.2 |
| 9 | YELLOW | 96.1 |
| | 5 MINUTES | |
| 10 | RED | 96.4 |
| 8 | BLUE | 96.7 |
| 11 | GREEN | 96.6 |
| 9 | YELLOW | 95.8 |
| | 6 MINUTES | |
| 10 | RED | 96.2 |
| 8 | BLUE | 96.6 |
| 11 | GREEN | 96.5 |
| 9 | YELLOW | 95.7 |
| | 7 MINUTES | |
| 10 | RED | 96.3 |
| 8 | BLUE | 96.6 |
| 11 | GREEN | 96.5 |
| 9 | YELLOW | 95.8 |
| | 8 MINUTES | |
| 10 | RED | 96.3 |
| 8 | BLUE | 96.6 |
| 11 | GREEN | 96.5 |
| 9 | YELLOW | 95.8 |
| | 9 MINUTES | |
| 10 | RED | 96.3 |
| 8 | BLUE | 96.6 |
| 11 | GREEN | 96.5 |
| 9 | YELLOW | 95.9 |

TEST #2 (FIG. 17)
OXYGEN AT EXHAUST: 21.1
SET POINT AT 97.0° F.

| POSITION | COLOR CODE | TEMP.(degrees F) |
|---|---|---|
| | START | |
| 3 | RED | 94.2 |
| 1 | BLUE | 96.0 |
| 4 | GREEN | 96.3 |
| 2 | YELLOW | 95.3 |
| | 1 MINUTE | |
| 3 | RED | 98.2 |
| 1 | BLUE | 98.9 |
| 4 | GREEN | 98.9 |
| 2 | YELLOW | 98.1 |
| | 2 MINUTES | |
| 3 | RED | 98.0 |
| 1 | BLUE | 98.5 |
| 4 | GREEN | 98.5 |
| 2 | YELLOW | 98.0 |
| | 3 MINUTES | |
| 3 | RED | 97.3 |
| 1 | BLUE | 97.4 |
| 4 | GREEN | 97.3 |
| 2 | YELLOW | 97.2 |
| | 4 MINUTES | |
| 3 | RED | 96.7 |
| 1 | BLUE | 96.8 |
| 4 | GREEN | 97.0 |
| 2 | YELLOW | 96.7 |
| | 5 MINUTES | |
| 3 | RED | 96.5 |
| 1 | BLUE | 96.6 |
| 4 | GREEN | 96.8 |
| 2 | YELLOW | 96.6 |
| | 6 MINUTES | |
| 3 | RED | 96.5 |
| 1 | BLUE | 96.5 |
| 4 | GREEN | 96.7 |
| 2 | YELLOW | 95.6 |
| | 8 MINUTES | |
| 3 | RED | 96.3 |
| 1 | BLUE | 96.3 |
| 4 | GREEN | 96.5 |
| 2 | YELLOW | 96.4 |

TEST #3 (FIG. 18)
CENTER DRAWER
TEMPERATURE SET POINT AT 97.0° F.
HUMIDITY SET POINT AT 30.0% → H = POSITION 10 → 32.6%

| POSITION | COLOR CODE | TEMP.(degrees F) |
|---|---|---|
| | 1 MINUTE | |
| 5 | RED | 92.8 |
| 6 | GREEN | 94.4 |
| 7 | BLUE | 94.4 |
| | 2 MINUTES | |
| 5 | RED | 97.5 |
| 6 | GREEN | 97.6 |
| 7 | BLUE | 97.3 |
| | 3 MINUTES | |
| 5 | RED | 98.0 |
| 6 | GREEN | 98.0 |
| 7 | BLUE | 97.8 |
| S | | 96.8 |
| T | | 97.8 |
| | 4 MINUTES | |
| 5 | RED | 97.6 |
| 6 | GREEN | 97.5 |
| 7 | BLUE | 97.4 |
| S | | 97.0 |
| T | | 97.7 |
| | 5 MINUTES | |
| 5 | RED | 96.8 |
| 6 | GREEN | 96.8 |
| 7 | BLUE | 96.8 |
| S | | 97.0 |
| T | | 97.4 |
| | 6 MINUTES | |
| 5 | RED | 96.2 |
| 6 | GREEN | 96.2 |
| 7 | BLUE | 96.2 |

-continued

TEST #3 (FIG. 18)
CENTER DRAWER
TEMPERATURE SET POINT AT 97.0° F.
HUMIDITY SET POINT AT 30.0% → H = POSITION 10 → 32.6%

| POSITION | COLOR CODE | TEMP.(degrees F) |
|---|---|---|
| S |  | 96.9 |
| T |  | 96.8 |
| 7 MINUTES | | |
| 5 | RED | 96.2 |
| 6 | GREEN | 96.1 |
| 7 | BLUE | 96.1 |
| S |  | 96.9 |
| T |  | 96.7 |
| 10 MINUTES | | |
| 5 | RED | 96.3 |
| 6 | GREEN | 96.3 |
| 7 | BLUE | 96.2 |
| S |  | 97.0 |
| T |  | 96.7 |

TEST #4 (FIG. 19)
CENTER DRAWER BOTTOM
HUMIDITY POSITION # 11 → 31.9%
SET POINT AT 30.0%

| POSITION | COLOR CODE | TEMP.(degrees F) |
|---|---|---|
| 1 MINUTE | | |
| 14 | RED | 89.3 |
| 13 | GREEN | 91.2 |
| 12 | BLUE | 92.3 |
| S |  | 94.3 |
| T |  | UNDER 94.0° |
| 2 MINUTES | | |
| 14 | RED | 97.2 |
| 13 | GREEN | 97.1 |
| 12 | BLUE | 97.3 |
| S |  | 96.2 |
| T |  | 96.8 |
| 3 MINUTES | | |
| 14 | RED | 98.4 |
| 13 | GREEN | 97.8 |
| 12 | BLUE | 97.7 |
| S |  | 96.7 |
| T |  | 97.5 |
| 4 MINUTES | | |
| 14 | RED | 98.3 |
| 13 | GREEN | 97.8 |
| 12 | BLUE | 97.7 |
| S |  | 96.7 |
| T |  | 97.5 |
| 5 MINUTES | | |
| 14 | RED | 98.3 |
| 13 | GREEN | 97.7 |
| 12 | BLUE | 97.4 |
| S |  | 97.1 |
| T |  | 97.7 |
| 6 MINUTES | | |
| 14 | RED | 97.5 |
| 13 | GREEN | 96.9 |
| 12 | BLUE | 96.7 |
| S |  | 97.1 |
| T |  | 97.3 |
| 7 MINUTES | | |
| 14 | RED | 96.8 |
| 13 | GREEN | 96.4 |

-continued

TEST #4 (FIG. 19)
CENTER DRAWER BOTTOM
HUMIDITY POSITION # 11 → 31.9%
SET POINT AT 30.0%

| POSITION | COLOR CODE | TEMP.(degrees F) |
|---|---|---|
| 12 | BLUE | 96.3 |
| S |  | 96.9 |
| T |  | 96.6 |
| 8 MINUTES | | |
| 14 | RED | 96.5 |
| 13 | GREEN | 96.2 |
| 12 | BLUE | 96.1 |
| S |  | 96.9 |
| T |  | 96.6 |
| 11 MINUTES | | |
| 14 | RED | 96.7 |
| 13 | GREEN | 96.4 |
| 12 | BLUE | 96.3 |
| S |  | 97.0 |
| T |  | 96.7 |
| 13 MINUTES | | |
| 14 | RED | 96.6 |
| 13 | GREEN | 96.2 |
| 12 | BLUE | 96.1 |
| S |  | 97.0 |
| T |  | 96.6 |

TEST #5 (FIG. 20)
HUMIDITY
SET POINT AT 30.0%

| POSITION | TEMP.(degrees F) |
|---|---|
| 1 | 31.6% |
| 2 | 32.3% |
| 3 | 32.3% |
| 4 | 31.2% |
| 8 | 32.0% |
| 9 | 33.5% |
| 10 | 32.6% |
| 11 | 31.9% |

It will be appreciated that changes and modifications may be made in the incubator device of the present invention without departing from the scope of the appended claims. Therefore, the foregoing description and accompanying drawings are intended to be illustrative only and should not be viewed in a limiting sense. Merely by way of example, the design silhouette of the incubator may vary in other embodiments of the invention. Likewise, the overall size of the unit may be altered. Other materials maybe used in place of those described in connection with the preferred embodiments. These variations are merely illustrative.

What is claimed:

1. A device for the propagation of bird eggs comprising:
a sealed insulated compartment having an access means;
an egg rotating device disposed to hold a plurality of bird eggs within said insulated compartment;
an air mixing chamber separate from said sealed insulated compartment in fluid communication with said insulated compartment;
an air outlet port adapted to allow exhaust air to exit said insulated compartment, said air outlet port disposed to allow less outflow of air through the air outlet means than an inflow of air into the insulated compartment from the air mixing chamber so as maintain a positive pressure within said insulated compartment;

a moisture supply adapted to allow moisture to enter said air mixing chamber;

heating elements in said air mixing chamber;

at least one air distribution fan positioned between said insulated compartment and said air mixing chamber disposed to move air from said air mixing chamber into said insulated compartment;

electronic controls for controlling the airflow into and out of said air mixing chamber; and electronic controls for controlling the temperature and humidity within said air mixing chamber so as to control the temperature and humidity of air flowing into said insulated compartment.

2. The device of claim 1 wherein said insulated compartment is a four sided box having a top and a bottom, said air mixing chamber located on a back side and comprising an enclosure surrounding said air inlet, said mixing chamber having at least one air outlet adapted to allow air to flow into said insulated compartment, said mixing chamber further containing at least one heating element, at least one fan, and mean for introducing moisture into said mixing chamber.

3. The device of claim 2 having three fans.

4. The device of claim 2 having two heating elements.

5. The device of claim 2 wherein said air outlet means is positioned adjacent said bottom of said four sided box.

6. The device of claim 5 wherein said motive means comprises at least one motor driven drive rod perpendicular to said rotatable rods, said drive rod being operatively connected to each said rotatable rod by a drive belt so that rotation of said drive rod effects rotation of each said rotatable rod.

7. The device of claim 2 wherein said air distribution means is positioned adjacent said top of said four sided box.

8. The device of claim 1 wherein said egg rotating means is removable and interchangeable.

9. The device of claim 1 wherein said egg turning device comprises a plurality of spaced apart rotatable rods, the spacing of which is such that the width of the eggs can be supported between adjacent pairs of said rods, motive means for rotating said rods so as to cause the eggs to rotate about the longitudinal axis of said eggs and means for controlling said motive means.

10. The device of claim 9 wherein said rods have a cushioned outer surface in the egg contacting area.

11. The device of claim 1 where in said egg turning device comprises a rotary rack, said rotary rack having a plurality of discrete egg holding means each designed to hold a plurality of eggs, each said egg holding means comprised of four horizontal spaced apart rods arranged in a rectangular pattern wherein said eggs are positioned and secured between the rods.

12. The device of claim 11 wherein one of said four horizontal spaced apart rods is removable so as to provide access between said rods to position the eggs.

13. The device of claim 11 wherein said rotary rack has a circular configuration.

14. The device of claim 11 wherein said rotary rack has a rectangular configuration.

15. The device of claim 1 wherein said egg turning device comprises a drawer having a plurality of rotatable egg carriers in horizontal alignment therein, each said rotatable egg carrier comprising four horizontal spaced apart rods arranged in a rectangular pattern wherein said eggs are positioned and secured between the rods.

16. The device of claim 1 wherein said egg turning means have a computer controlled motive means to cause rotation of the eggs to a pre-selected extent over a pre-selected time interval.

17. The device of claim 1 wherein said access means comprises an insulated front door that can be opened, said door having a pair of glass plates separated by a gas space.

18. The device of claim 1 further comprising computer means for monitoring the incubation of the eggs.

19. A method for incubating a bird egg comprising the steps of:

placing the egg in an incubator, said incubator comprising a sealed insulated compartment with air outlet port, an egg rotating device within the compartment for holding and rotating the bird egg, an air mixing chamber with air and moisture inlets and air heating elements in fluid communication with the insulated compartment, air distribution fan between the air mixing chamber and insulated compartment, and controls for controlling the air flow in and out of the air mixing chamber and for controlling the temperature and humidity within the air mixing chamber;

monitoring the air flow, temperature, and humidity in the insulated compartment;

uniformly maintaining the air in the insulated compartment at a suitable incubation temperature and humidity;

maintaining the air pressure within the insulated compartment at a suitable pressure;

allowing the air in the insulated compartment to flow from the top of the insulated compartment to the bottom of the insulated compartment;

venting the air from the bottom of the insulated compartment; and rotating the eggs to periodically effect rotation of the eggs about a horizontal axis of the egg.

20. The method of claim 19 wherein the steps of maintaining the air pressure and venting the air further include maintaining a suitable ratio of inflowing air to exhaust air.

21. The method of claim 19 wherein the incubation temperature is in the range of about 97° to 97.5° F. and the incubation humidity is in the range of about 35 to 55 percent.

22. The method of claim 19 further comprising the step of computer monitoring the incubation of the eggs.

23. A device for the incubation of bird eggs comprising:

an insulated incubation cabinet having a predetermined configuration with an insulated door allowing access therein;

an egg rotating device within the cabinet;

an environmental control box external of the cabinet, the control box having an air inflow passage formed therein and being in fluid communication with an upper end of the cabinet;

an air vent port at a lower end of the cabinet;

a humidifier operatively connected to the environmental control box;

a heating element operatively connected to the environmental control box;

three fans positioned between the environmental control box and the cabinet to effect air flow from the environmental control box to the cabinet; and a control device for monitoring and controlling the humidifier, the heating element and the fans;

wherein the air, humidity and temperature are monitored and controlled in the environmental control box and moved into the upper end of the cabinet by the fans, the air being vented through the vent port in to the lower end of the cabinet to uniformly maintain the environment with the cabinet at a suitable temperature, humidity and air pressure.

24. A device for the propagation of bird eggs comprising:

a sealed insulated compartment at least one side, a top and a bottom and a sealable access opening, said top, bottom and side defining a insulated chamber;

air outlet port in said insulated chamber to allow exhaust air to exit said insulated compartment;

an air mixing chamber on a back side of said insulated compartment comprising an enclosure surrounding an air passage between the mixing chamber and insulated compartment, said mixing chamber containing at least one heating element, at least one fan, and a humidity source;

an air inlet vent adapted to allow air into said mixing chamber;

electronic controls for controlling the airflow into and out of the air mixing chamber; and electronic controls for controlling the temperature and humidity within said air mixing chamber so as to control the temperature and humidity of air flowing into said insulated compartment.

* * * * *